(12) United States Patent
Cheng et al.

(10) Patent No.: US 8,233,027 B2
(45) Date of Patent: Jul. 31, 2012

(54) VIDEO CONFERENCE APPARATUS AND METHOD THEREOF

(75) Inventors: Hsien-Wen Cheng, Chung Ho (TW);
Shu-Te Lien, Chung Ho (TW);
Kun-Chou Chen, Chung Ho (TW)

(73) Assignee: Avermedia Information, Inc., Chung Ho, Taipei Hsien (TW)

( * ) Notice: Subject to any disclaimer, the term of this patent is extended or adjusted under 35 U.S.C. 154(b) by 493 days.

(21) Appl. No.: 12/633,013

(22) Filed: Dec. 8, 2009

(65) Prior Publication Data
US 2011/0050843 A1 Mar. 3, 2011

(30) Foreign Application Priority Data
Sep. 1, 2009 (TW) .............................. 98129442 A

(51) Int. Cl.
*H04N 7/14* (2006.01)

(52) U.S. Cl. .................................. 348/14.08; 348/14.11
(58) Field of Classification Search .............. 348/14.08, 348/14.09, 14.11; 370/260; 379/202.01
See application file for complete search history.

(56) References Cited

U.S. PATENT DOCUMENTS

| | | | | |
|---|---|---|---|---|
| 6,075,571 A | * | 6/2000 | Kuthyar et al. | 348/14.08 |
| 6,122,259 A | * | 9/2000 | Ishida | 370/260 |
| 2004/0179598 A1 | * | 9/2004 | Zhou et al. | 375/240.11 |
| 2010/0149304 A1 | * | 6/2010 | Chao et al. | 348/14.08 |

* cited by examiner

*Primary Examiner* — Quoc D Tran
(74) *Attorney, Agent, or Firm* — Thomas, Kayden, Horstemeyer & Risley, LLP

(57) ABSTRACT

A video conference apparatus having a path-selecting unit is disclosed. A camera data captured by a camera can be transferred into the video processor via a content data path and be displayed as a content video, or the camera data can be transferred into a video processor via a camera data path and be displayed as a live video. A video conference method thereof is also disclosed.

17 Claims, 6 Drawing Sheets

VIDEO CONFERENCE APPARATUS AND METHOD THEREOF

RELATED APPLICATIONS

This application claims priority to Taiwan Application Serial Number 98129442, filed Sep. 1, 2009, which is herein incorporated by reference.

BACKGROUND

1. Technical Field

The present invention relates to a video conference apparatus. More particularly, the present invention relates to a video transmitting method for video conference apparatus.

2. Description of Related Art

Video conference is held to connect different spaces within a conference room via internet and video conference apparatus, thereby people at different places seem to be gathered in the same conference room. The video conference rooms of different places are connected by internet, and each video conference room is equipped with a camera, a display, a microphone, and a speaker.

The image source of the video conference apparatus can be provided by a camera and displayed as a live video. The image source of the video conference apparatus can be provided by a computer and displayed as a content video. The image provided by the camera and the image provided by the computer are transmitted to the video processor via different paths. The display can be divided into multi sections for displaying the live video from the camera and the content video from the computer respectively.

The camera does not only capture the image of speakers but also captures the image of an object, such as a document or an exhibition during video conference in some situation for better description. However, there is only one camera disposed in one conference room, the audience would feel uncomfortable if the camera frequently switches between the speaker and the object.

SUMMARY

An embodiment of the invention provides a video conference apparatus, which includes a camera processor for receiving a camera data, a content processor, a video processor, a camera data path connecting the camera processor and the video processor, a content data path connecting the content processor and the video processor, and a path-selecting unit connected to the camera processor and the content processor, and the video processor respectively. The camera data received by the camera processor can be transmitted to the video processor via the content data path and is displayed as a content video, or the camera data can be transmitted to the video processor via the camera data path and is displayed as a live video.

Another embodiment of the invention provides a video conference method, which includes capturing a first image of a first position by a camera, transmitting the first image to a video processor via a camera data path, turning the camera to a second position and capturing a second image, operating a path-selecting unit for transmitting the second image to the video processor via a content data path, encoding the first image into a video stream, encoding the second image into a content stream, and transmitting the video stream and the content stream.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
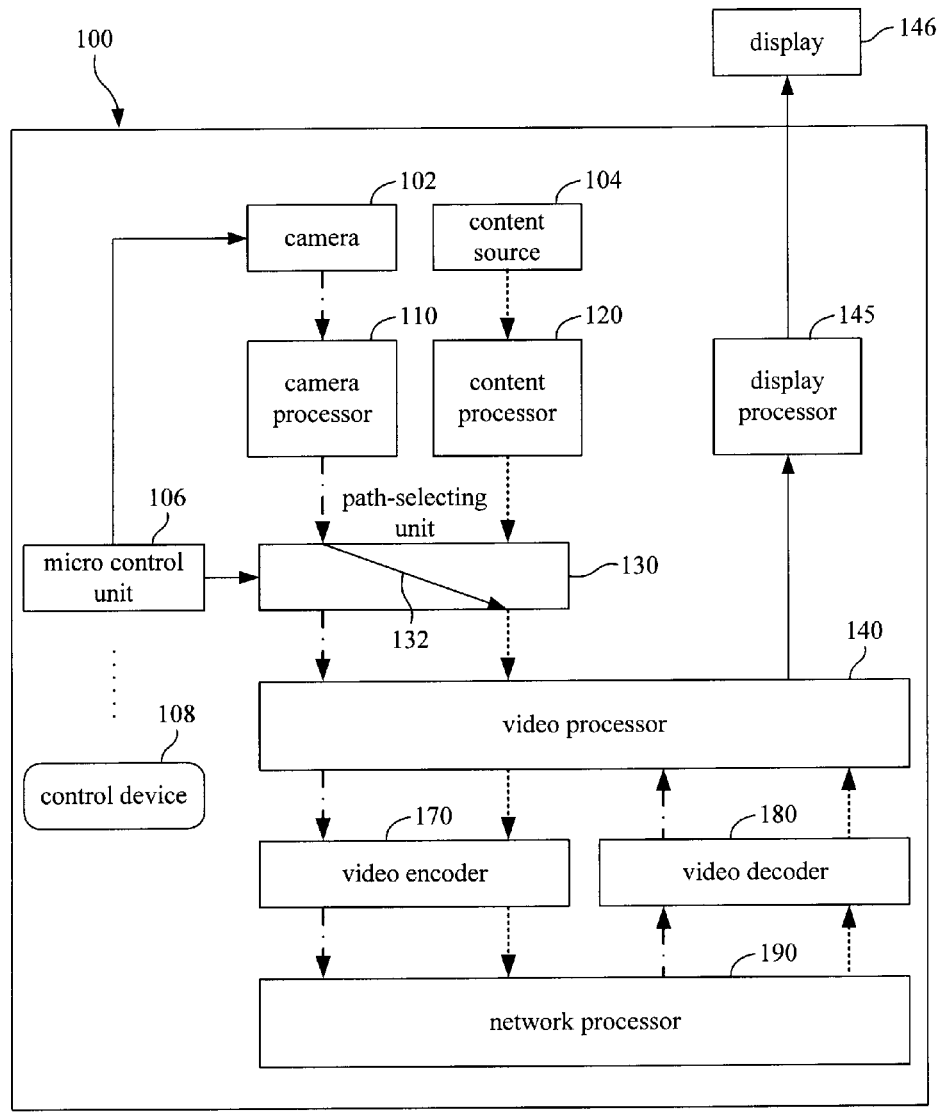
FIG. 1 is a block diagram of a first embodiment of the video conference apparatus of the invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram of a first embodiment of the video conference apparatus of the invention. The video conference apparatus 100 includes a camera 102, a content source 104, a camera processor 110 connected to the camera 102, a content processor 120 connected to the content source 104, a video processor 140, and a path-selecting unit 130. The path-selecting unit 130 is connected to the camera processor 110 and the content processor 120, and the video processor 140 respectively.

The camera 102 is a PTZ camera for capturing image and providing camera data. The camera processor 110 receives the camera data provided from the camera 102 and preprocesses the camera data. The camera 102 can be built-in the host of the video conference apparatus 100, or the camera 102 can be external connected to the host of the video conference apparatus 100. The content source 104 can be a laptop computer, a computer, or a document projector. The content data provided by the content source 104 is transmitted to the content processor 120 for preprocessing. The preprocessed camera data and the content data are transmitted to the video processor 140 via the path-selecting unit 130.

The video conference apparatus 100 includes a micro control unit 106 for controlling the direction of the camera 102, storing the coordinate of the camera 102, and selecting the path of the camera data. The video conference apparatus 100 also includes a control device 108 electrically connected to the micro control unit 106. The control device 108 can be a remote control or several buttons on the host of the video conference apparatus. The signal of the control device 108 is transmitted to the micro control unit 103 for operating the video conference apparatus 100.

The video conference apparatus 100 includes a camera data path 150 and a content data path 160. The video conference apparatus 100 includes a video encoder 170 and a video decoder 180 connected to the video processor 140. The video conference apparatus 100 includes a network processor 190 connected to the video encoder 170 and the video decoder 180. The camera data preprocessed by the camera processor 110 can be directly transmitted to the video processor 140 via the camera data path 150. Then the processed camera data is transmitted to the video encoder 170 via the camera data path 150, and the camera data are encoded into video stream with video format or image file compression format, such as H261, H263, H264, MPEG2, MPEG4, etc. The video stream is transmitted to the network processor 190 by package sending via Internet. Another video conference apparatus 100 at the other end receives the video stream and decodes the video stream into the camera data via the video decoder 180, and the camera data is transmitted to the video processor 140 for displaying.

The content data preprocessed by the content processor 120 are directly transmitted to the video processor 140 via the content data path 160. Then the content data is transmitted to the video encoder 170 via the content data path 160, and the content data are encoded into video stream with video format or image file compression format, such as H261, H263, H264, MPEG2, MPEG4, JPEG, etc. The video stream is transmitted to the network processor 190 for package sending via Internet. Another video conference apparatus 100 at the other end receives the video stream and decodes the video stream into the content data via the video decoder 180, and the content data is transmitted to the video processor 140 for displaying.

The camera data provided by the camera 102 can be sent to the content data path 160 by the path-selecting unit 130, so that the camera data can be transmitted into the video processor 140 and be further processed and displayed as the content data. The path-selecting unit 130 includes a switching path 132. The switching path 132 connects the camera data path 150 and the content data path 160.

Users can operate the control device 108 for selecting the path in the path-selecting unit 130, so that the camera data can be selectively transmitted to the content data path 160 or to the camera data path 150 and be displayed as a live video or a content video.

The video processor 140 can scale up or scale down the camera data and/or the content data to form an output image according to the display setting such as single frame display setting, multi-frame display setting, or multi-display display setting. The output image is transmitted to the display processor 145, and transmitted to one display 146 or plural displays 146 for displaying.

The video conference apparatus 100 in this embodiment can record and display the object's image captured by the camera 102 as the content video immediately, thereby the speaker's image and the object's image can be displayed simultaneously in the video conference. The users need not produce the power point of the object's image previously. The image during turning the camera 102 would not be shown on the display, so that the audience would not feel uncomfortable because of the movement of the camera 102.

Figure 2A:
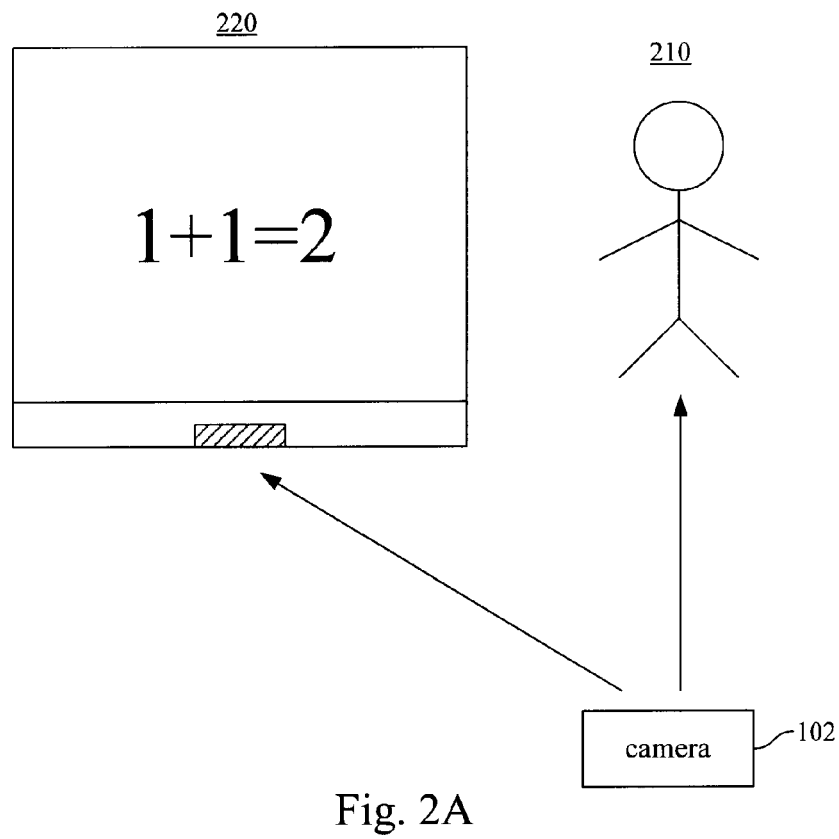
FIG. 2A and FIG. 2B are the schematic diagram and the output image of the embodiment for utilizing the video conference apparatus 100 of FIG. 1.
Figure 2B:
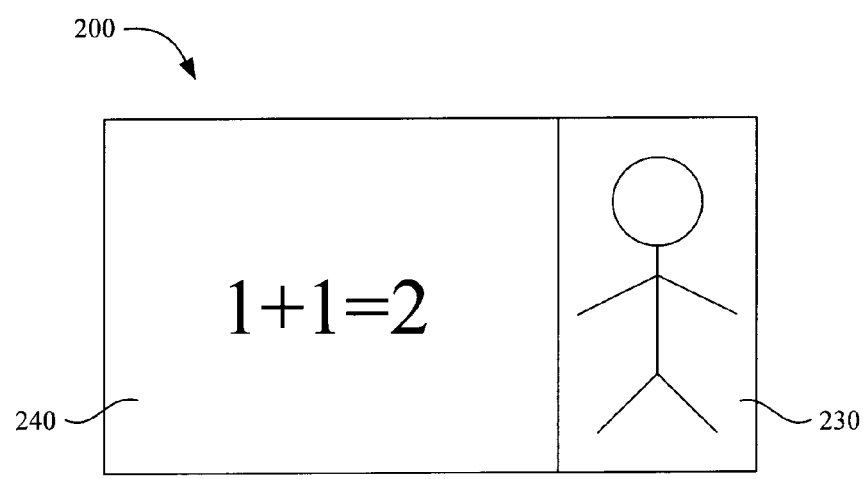

FIG. 2A and FIG. 2B are the schematic diagram and the output image of the embodiment for utilizing the video conference apparatus 100 of FIG. 1. Please refer to FIG. 2A. The camera 102 is set for capturing the image of the first position 210 and the image of the second position 220. The first position 210 is the place where the speaker stands, and the second position 220 is the place where a whiteboard locates. The image of the second position 220 captured by the camera 102 is transmitted to the video processor 140 via the content data path 160 and be processed as the content data in this embodiment. The image of the second position 220 is output as the content image, as shown in FIG. 2B.

In FIG. 2B, the output image 200 includes the first image 230 of the first position 210 and the second image 240 of the second position 220. The first image 210 is a live video to simultaneously display the image of the speaker who stands at the first position 210. The second image 240 keeps outputting the image captured at the second position 220 previously till a further action is made. Namely, the first image 230 is regarded as a live video of the first position 210, and the second image is a static video of the second position 220. The first image 230 and the second image 240 are provided by the same camera 102.

The second position 220 is not limited in the place for setting the whiteboard, the second position 220 can be the place where the display object is placed or the document in different embodiments, or the first image 230 and the second image 240 can be displayed in different displays respectively.

Figure 3:
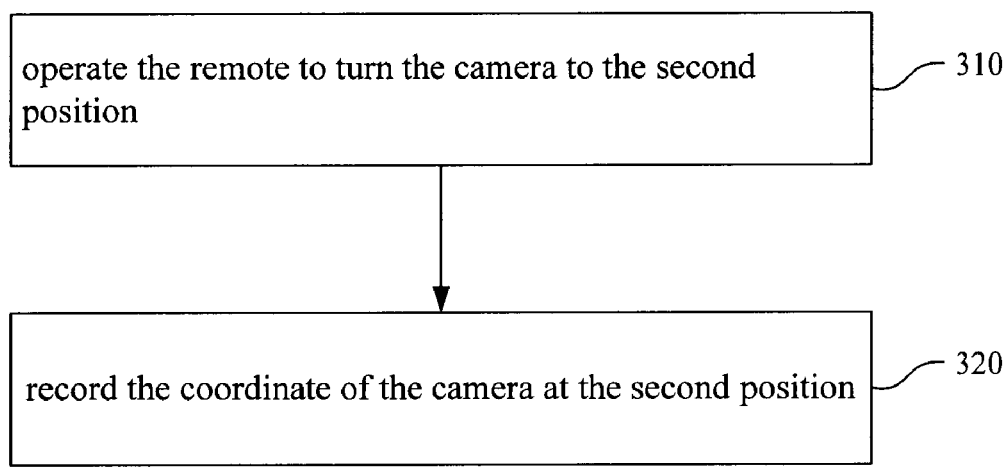
FIG. 3 is a flow chart diagram of a method for setting the camera at the second position of the invention.

As disclosed above, the camera is switched between the first position and the second position during the video conference, so that there is a need to set the coordinate of the second position before the video conference. FIG. 3 is a flow chart diagram of a method for setting the camera at the second position of the invention. A user can operate the remote to turn the camera to the second position in step 310. Then the coordinate of the camera at the second position is recorded and stored in the micro control unit when the user presses a button of the remote in step 320. Step 310 further includes zoom in or zoom out the camera to the preferred second position, and the state of the camera is stored in the micro control unit in step 320.

Figure 4:
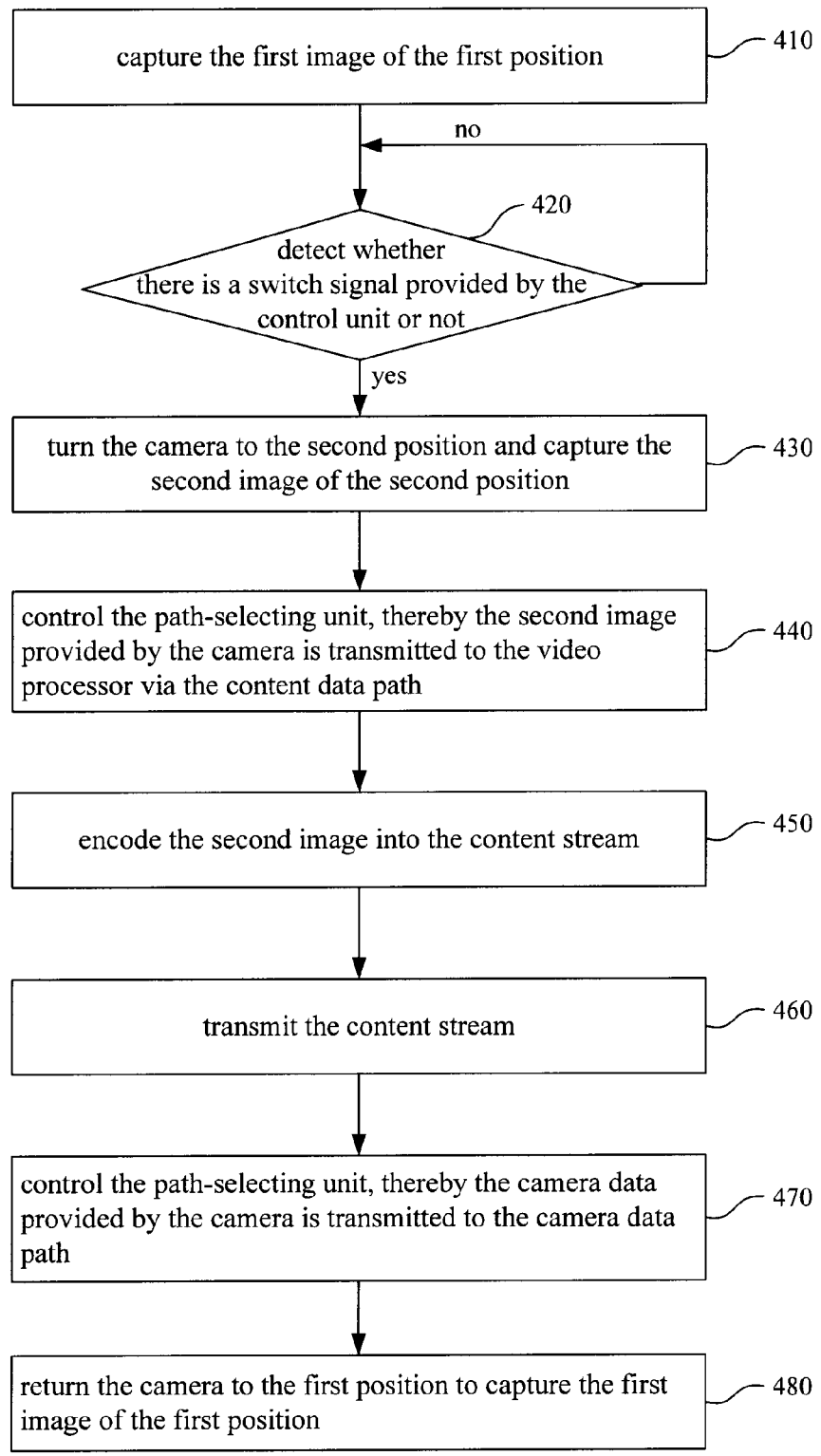
FIG. 4 is a flow chart diagram of a first embodiment of the video conference method of the invention.

FIG. 4 is a flow chart diagram of a first embodiment of the video conference method of the invention. The camera captures the first image of the first position in step 410. In step 420, the micro control unit detects whether there is a switch signal provided by the control unit or not. If the switch signal is detected by the micro control unit in step 420, then step 430 is to turn the camera to the second position by the micro control unit, so that the camera can capture the second image of the second position. The path-selecting unit is controlled by the micro control unit, thereby the second image provided by the camera is transmitted to the video processor via the content data path in step 440. Step 450 is to encode the second image into the content stream. Step 460 is to transmit the content stream to a far end video conference apparatus via Internet. Then the path-selecting unit is controlled by the micro control unit in step 470 when the user operates the control unit, thereby the camera data provided by the camera is transmitted via the camera data path. Then the camera is returned to the first position to capture the first image of the first position by the operation of the micro control unit in step 480, thereby the first image provided by the camera is output via the camera data path.

The first image of the first position captured by the camera is transmitted to another video conference apparatus via the camera data path in step 410. The switch signal in step 420 can be provided by a near end control unit or a far end control unit. The near end is the end of capturing the image and outputting the image data. The far end is the end receiving the image data. The control unit can be a remote control or buttons on the video conference apparatus. Users can operate the control unit to provide the switch signal to the micro control unit.

In Step 430, the micro control unit receives the switch signal provided by the control unit and reads the coordinate of the second position stored previously, as shown in FIG. 3, thereby the camera can be turned to the second position by the micro control unit. The camera can be further zoomed in or zoomed out by the micro control unit to select the frame of the second image in step 430. Step 480 further includes encoding the first image to a video stream, and the video stream is transmitted to the far end video conference apparatus via Internet.

The first image captured by the camera at the first position is transmitted to the far end video conference apparatus via the camera data path, and the first image is displayed as a live video. The second image captured by the camera at the second position is transmitted to the far end video conference apparatus via the content data path, and the second image is displayed as the content video.

Figure 5:
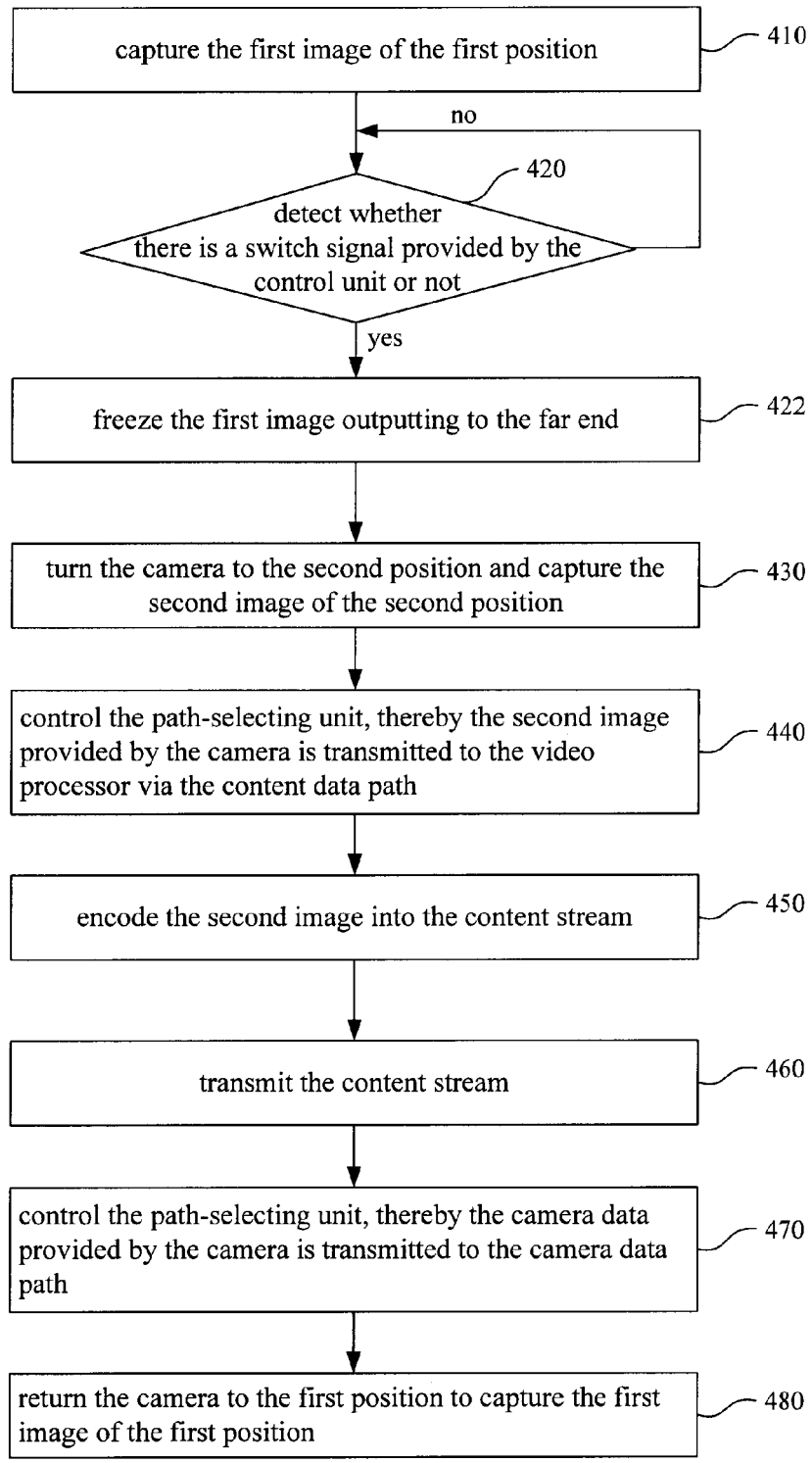
FIG. 5 is a flow chart diagram of a second embodiment of the video conference method of the invention.

FIG. 5 is a flow chart diagram of a second embodiment of the video conference method of the invention. This embodiment further includes step 422 after step 420 of receiving the switch signal, wherein the step 422 is to freeze the first image outputting to the far end, i.e. the output image outputted by the video processor in the camera data path is frozen. The output image in camera data path is frozen till step 480, wherein the camera is returned to the first position and the first image is back to the camera data path in step 480. In step 422, only the output image is frozen, the sound of the near end is normally transmitted to the far end.

Figure 6:
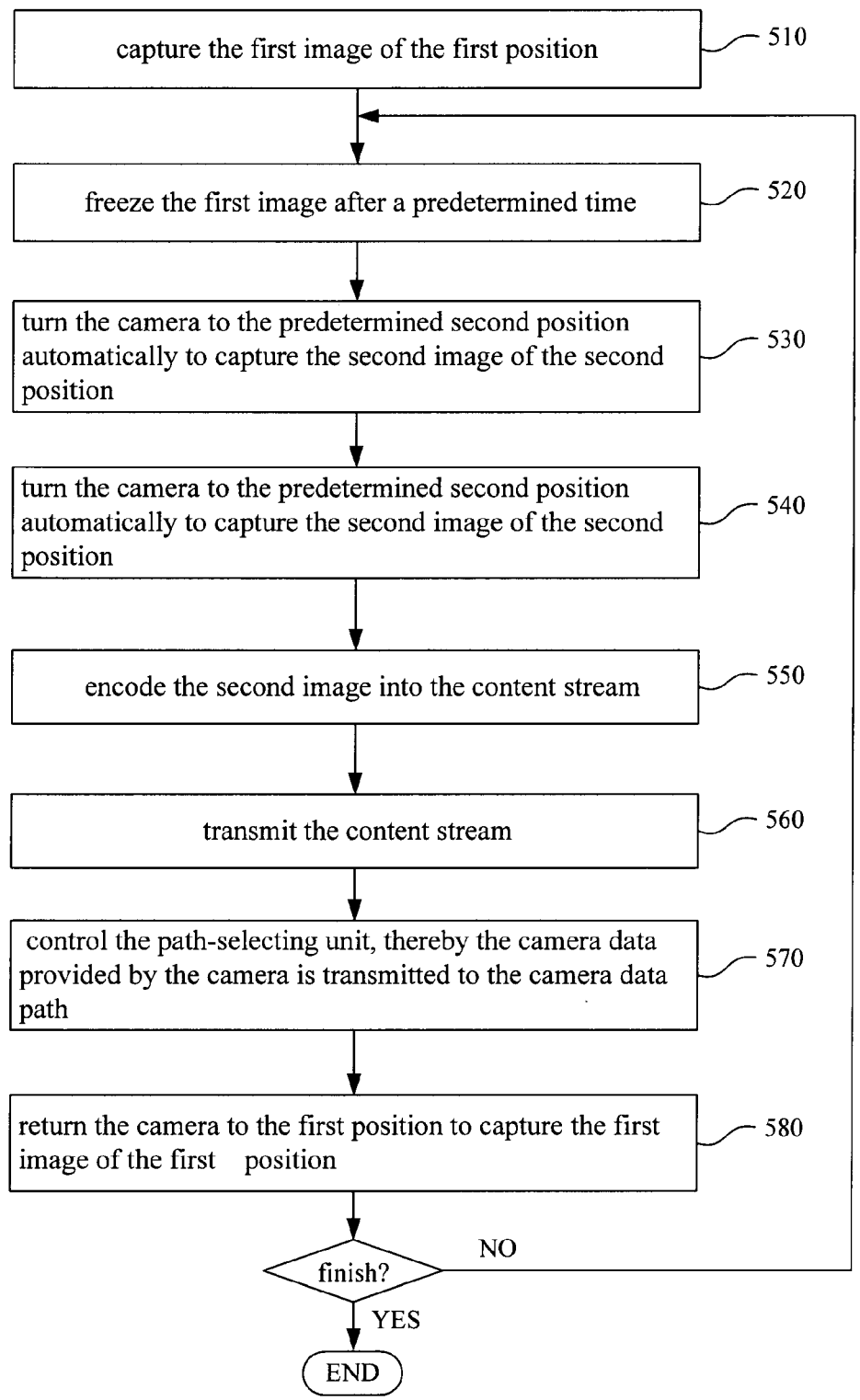
FIG. 6 is a flow chart diagram of a third embodiment of the video conference method of the invention.

FIG. 6 is a flow chart diagram of a third embodiment of the video conference method of the invention. The camera can be set to switch between the first position and the second position periodically to capture the video of the speaker at the first position and the picture of the object at the second position automatically, so that the output second image can be updated automatically without operating the control unit.

Step 510 is the camera captures the first image of the first position. Step 520 is to freeze the first image, which is going to be transmitted to the far end, after a predetermined time. Step 530 is the micro control unit controls the camera to turn to the predetermined second position automatically, and the camera captures the second image of the second position. In step 540, the path-selecting unit is controlled by the micro control unit, so that the second image provided by the camera is transmitted to the video processor via the content data path. Step 550 is to encode the second image into the content stream, and then the content stream is transmitted to the far end via Internet and is displayed as the content video in step 560. The second image for outputting to the far end is a static image and is displayed repeatedly as the content video. The path-selecting unit is controlled by the micro control unit, so that the camera image provided by the camera is return to the camera data path in step 570. In step 580, the camera returns to the second position by the micro control unit, and the first image captured by the camera at the first position is outputted via the camera data path.

The first image outputted by the video processor is frozen when the camera is switched between the first position and the second position in step 520. Namely the output image of the camera data path is frozen till the camera returns to the first position, i.e. the first image captured by the camera enters the camera data path once again. In step 520, the image is frozen, but the sound is still transmitted normally.

The first image captured by the camera at the first position is transmitted to the far end video conference apparatus via the camera data path, so that the first image is displayed as the live video. The second image captured by the camera at the second position is transmitted to the far end via the content data path, so that the second image is displayed as the content image (static image). The first image for being outputted to the far end is frozen during switching the camera, so that the audience would not feel uncomfortable.

The image captured by the camera can be transmitted via the content data path and be displayed as the content video. The image captured by the camera at different positions can be displayed as the live video or as the content video when the camera data is transmitted via the camera data path or the content data path, respectively. The live video and the content video of different positions can be displayed in the same display.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A video conference apparatus comprising:
a camera processor for receiving a camera data;
a content processor;
a video processor;
a camera data path connecting the camera processor and the video processor;
a content data path connecting the content processor and the video processor; and
a path-selecting unit connected to the camera processor and the content processor, and the video processor respectively, so that the camera data received by the camera processor is transmitted to the video processor via the content data path and is displayed as a content video, or the camera data is transmitted to the video processor via the camera data path and is displayed as a live video.

2. The video conference apparatus of claim 1, wherein the path-selecting unit comprises a switching path for connecting the camera data path and the content data path.

3. The video conference apparatus of claim 1, further comprising a camera built-in or external connected to the video conference apparatus, wherein the camera is connected to the camera processor.

4. The video conference apparatus of claim 3, further comprising a micro control unit connected to the camera and the path-selecting unit for controlling a direction of the camera, storing a coordinate of the camera, and selecting a path of the camera data.

5. The video conference apparatus of claim 4, further comprising a control device electrically connected to the micro control unit.

6. The video conference apparatus of claim 1, further comprising a video encoder and a video decoder connected to the video processor.

7. The video conference apparatus of claim 6, further comprising a network processor connected to the video encoder and the video decoder.

8. A video conference method comprising:
capturing a first image of a first position by a camera;
transmitting the first image to a video processor via a camera data path;
turning the camera to a second position and capturing a second image;
operating a path-selecting unit for transmitting the second image to the video processor via a content data path;
encoding the first image into a video stream;

encoding the second image into a content stream; and transmitting the video stream and the content stream.

9. The video conference method of claim 8, further comprising freezing the first image outputted by the video processor before turning the camera to the second position.

10. The video conference method of claim 8, wherein the step of turning the camera to the second position further comprises operating a control device.

11. The video conference method of claim 8, wherein the camera is switching between the first position and the second position periodically for capturing the first camera data and the second camera data respectively.

12. The video conference method of claim 8, wherein the step of turning the camera to the second position further comprises recording a coordinate of the camera.

13. The video conference method of claim 8, further comprising turning the camera back to the first position and capturing the first image after transmitting the content stream.

14. The video conference method of claim 13, further comprising operating the path-selecting unit for transmitting the first image to the video processor via the camera data path.

15. The video conference method of claim 14, wherein the first image and the second image are displayed in the same display.

16. The video conference method of claim 15, wherein the first image is a live video.

17. The video conference method of claim 15, wherein the second image is a static video.

* * * * *

UNITED STATES PATENT AND TRADEMARK OFFICE
CERTIFICATE OF CORRECTION

PATENT NO.           : 8,233,027 B2
APPLICATION NO.      : 12/633013
DATED                : July 31, 2012
INVENTOR(S)          : Cheng et al.

Page 1 of 1

It is certified that error appears in the above-identified patent and that said Letters Patent is hereby corrected as shown below:

On the Title page, item [73] assignee name, please replace "Avermedia Information, Inc." with "Aver Information Inc."

Signed and Sealed this
Second Day of October, 2012

David J. Kappos
*Director of the United States Patent and Trademark Office*